Feb. 7, 1933.  R. E. SCHIRMER  1,897,023
MOLDING METHOD AND APPARATUS
Filed Dec. 9, 1929
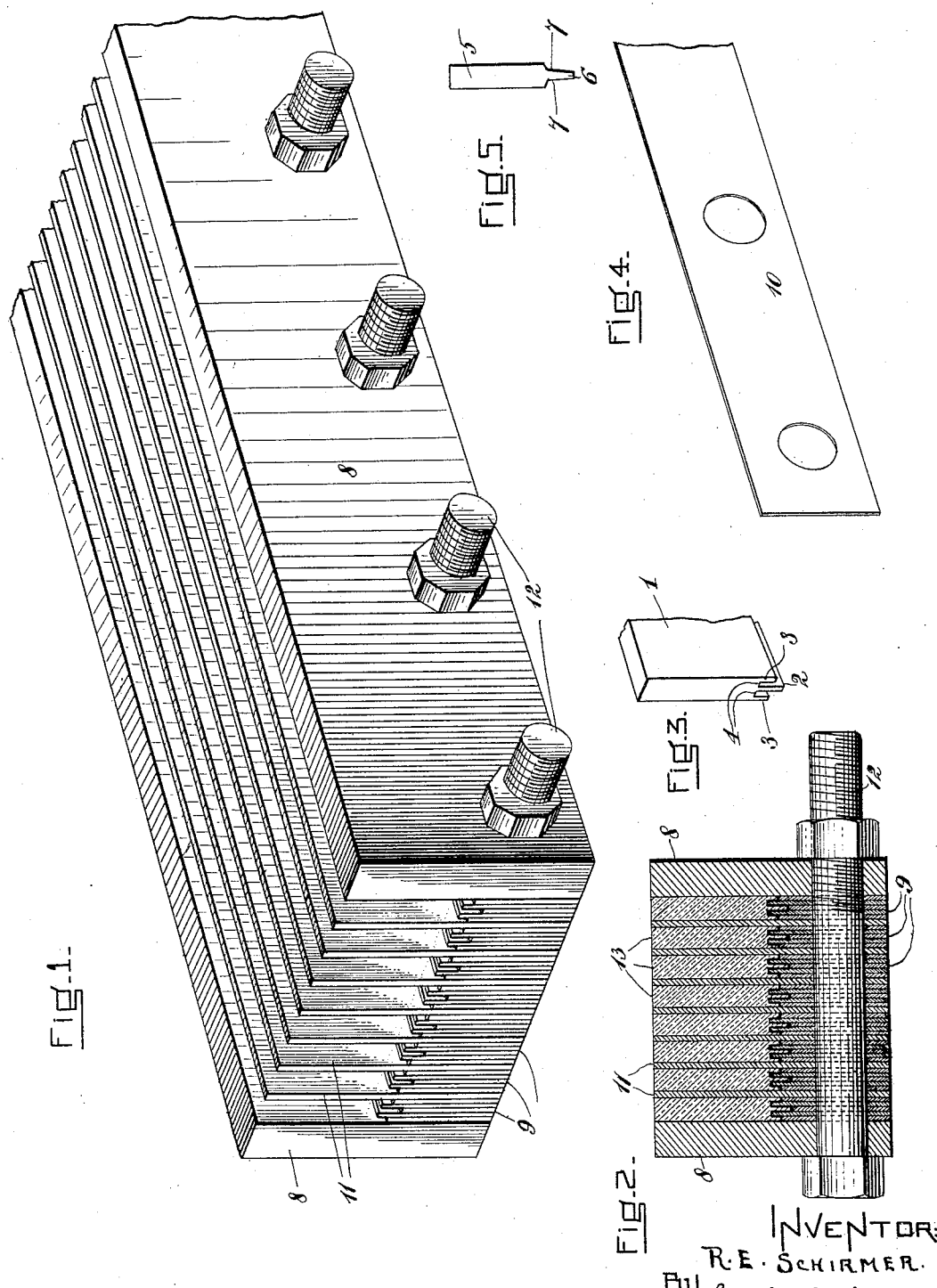

Patented Feb. 7, 1933

1,897,023

UNITED STATES PATENT OFFICE

RENS E. SCHIRMER, OF NEWTON CENTER, MASSACHUSETTS, ASSIGNOR, BY MESNE ASSIGNMENTS, TO RENS E. SCHIRMER, OF NEWTON CENTER, MASSACHUSETTS, AND LAWRIE L. WITTER, OF BOSTON, MASSACHUSETTS

MOLDING METHOD AND APPARATUS

Application filed December 9, 1929. Serial No. 412,822.

This invention relates to sectional molds and methods of forming the same and molding an article thereby. The primary object of the invention is to provide improvements therein.

The forming of some articles by molding presents considerable difficulty in the production of the mold. This is particularly true where very fine recesses or slots and adjacent projections or fins are required. To form such a mold by milling or otherwise cutting the fine slots in a solid block is not only very expensive but practically impossible. The operation quickly dulls the thin cutters required and where the fin left between the cutters is relatively thin the same easily breaks away in a manner destroying the mold. It is an object of my invention herein to provide an improved sectional mold in a manner avoiding these objections and difficulties and which mold will perform the desired molding operations with facility.

In a copending application, Serial Number 344,450, filed March 5, 1929, is disclosed an improved windshield wiper blade having one or more wiping fins on the wiping edge thereof, the fins being formed by recesses or slots on opposite sides thereof. It is a further object of my invention to provide an improved method and mold for producing these blades.

With the above and other objects in view, my invention consists of the features of construction and operation set forth in the following specification and illustrated in the accompanying drawing. In such drawing, I have illustrated certain specific embodiments of the invention but it will be understood that the invention can be otherwise embodied and that the drawing is not to be construed as defining or limiting the scope of the invention, the claims appended hereto being relied upon for that purpose.

Referring to the figures of the drawing:

Fig. 1 is a fragmentary perspective view of my improved mold.

Fig. 2 is a cross section therethrough.

Fig. 3 is a fragmentary view of one of the windshield wiper blades produced by the mold.

Fig. 4 is a fragmentary view of one of the strip sections used in the mold.

Fig. 5 is a fragmentary view of a modified form of blade which can also be produced by means of my invention.

The windshield wiper blade shown in Fig. 3 comprises a body portion 1 having its wiping edge formed into three fins 2 and 3 separated by recesses or slots 4. As illustrated, the middle fin 2 is relatively longer than the two outer fins 3. The blade 5 shown in Fig. 5 is similar except that its wiping edge has a single fin 6 formed by a pair of open recesses 7 on opposite sides thereof. The more specific purpose of my invention herein is to provide a method and apparatus for producing these blades and varying modifications thereof by molding from rubber.

The wiper blades are shown considerably enlarged in the drawing. It will therefore be understood that their fins and slots or recesses are so small and thin as to present considerable difficulty in manufacture. To produce a solid mold therefor is quite impossible and impracticable. I have therefore solved the problem by building up a mold of strips of sufficient width and arranged at such elevations in the mold as to produce these fins and slots with great facility. I furthermore preferably embody together several groups of the strips in a manner forming a compound mold adapted to make a plurality of blades at each molding operation. My method of forming the mold and producing the blades is extremely simple, cheap and most efficient in operation.

In the drawing, 8 indicates the side plates of my mold. Between these two plates are mounted a plurality of groups 9 of strips 10, the adjacent groups being separated by separating plates 11. The side plates 8, strips 9, 10 and separators 11 are secured together by bolts 12. As will be noted, the separators 11 serve as side plates for their adjacent strip groups 9.

Each strip 10, as illustrated in Fig. 4, is a flat metal strap of a thickness corresponding to the thickness of the part it is desired to produce. In the drawing I have shown the fins 2, 3 and slots 4 of the same thickness but it will be readily understood that these can be varied merely by varying the thickness of the corresponding strips 10 of the mold.

The strips 10 are arranged at the different elevations necessary to produce the fins and recesses. The middle strip of each group 9 is lowest to produce the fin 2. The two strips next adjacent are highest to produce the recesses or slots 4, and the two outer strips are at a medium height to produce the two outer fins 3. The blade shown in Fig. 5 can be made in like manner by arranging groups of three strips each at the proper elevations to produce the fins 6 and recesses 7.

The mold shown in the drawing is adapted to form eight blade strips 13 and the length of the mold may be such that each of these strips can be cut into several wiper blades.

I claim:

1. A sectional mold comprising side plates and a plurality of relatively thin and parallel bottom-forming strips therebetween and extending to different elevations in a manner to produce a plurality of recesses and a fin between adjacent recesses in the bottom face of the article molded thereby.

2. A compound sectional mold comprising side elements, a plurality of groups of strips therebetween and forming the bottom thereof, separators between the adjacent groups, and means securing the elements, strips and separators together in parallel relation with the strips in each group extending to varying elevations whereby to produce recesses and a fin or fins therebetween on the bottom edge of the article molded thereby, the separators acting to separate the articles from each other.

3. In a mold for forming an article having projecting from an edge thereof one or more relatively thin fins with relatively thin recesses adjacent to the sides thereof, a molding device comprising a plurality of relatively thin strips secured together in face to face contact with the edges thereof at one edge of the device projecting outwardly to different positions whereby to form the said fins and recesses on the article.

4. A sectional mold for forming rubber windshield wiper blades, comprising a pair of side plates, a plurality of relatively thin and parallel strips therebetween and in contact with each other and the side plates, and means for clamping the side plates and strips together to form a mold the bottom of which is the top edges of the strips, said top edges extending to different heights whereby to produce desired parallel contours on the bottom face of the blade molded therein.

5. A sectional mold for forming rubber windshield wiper blades, comprising a pair of side plates, a plurality of relatively spaced separator plates therebetween and parallel therewith, a plurality of relatively thin and parallel strips between adjacent plates and in contact with each other and the plates, and means for clamping the plates and strips together to form a compound mold the bottom of each section of which is the top edges of its said strips, the top edges of each group of strips extending to different heights whereby to produce desired parallel contours on the bottom faces of the blades molded therein.

In testimony whereof I affix my signature.

RENS E. SCHIRMER.